No. 840,654. PATENTED JAN. 8, 1907.
J. L. PALOUS.
DEVICE FOR PURIFYING AIR CONTAINING DUST.
APPLICATION FILED JULY 16, 1906.
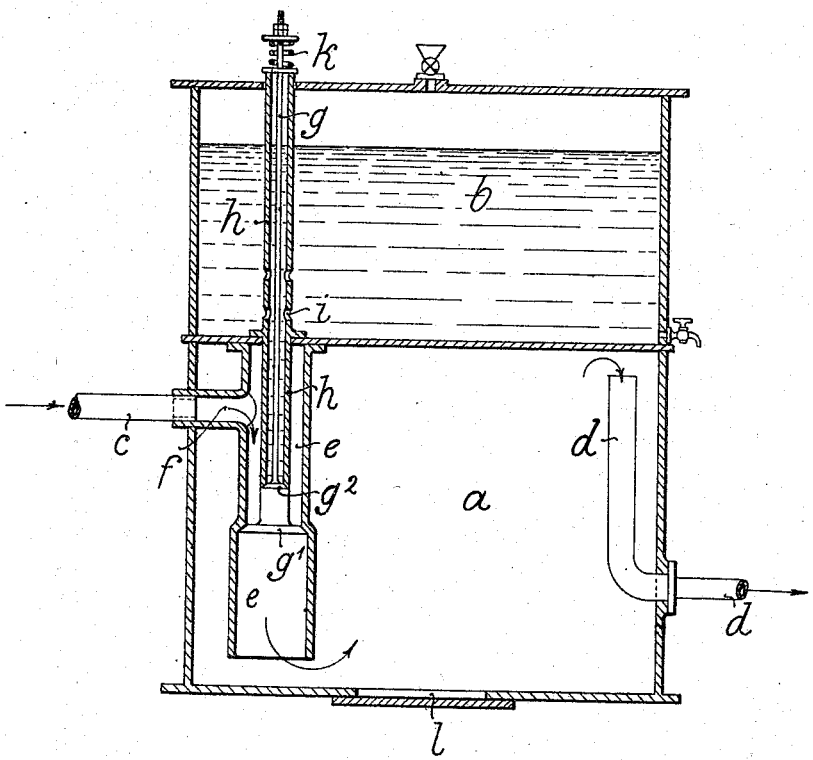

UNITED STATES PATENT OFFICE.

JOSEPH LÉON PALOUS, OF BERLIN, GERMANY.

DEVICE FOR PURIFYING AIR CONTAINING DUST.

No. 840,654.   Specification of Letters Patent.   Patented Jan. 8, 1907.

Application filed July 16, 1906. Serial No. 326,439.

*To all whom it may concern:*

Be it known that I, JOSEPH LÉON PALOUS, a subject of the Emperor of Austria-Hungary, and a resident at Wilhelmstrasse 139, Berlin, Germany, have invented a new and useful Improved Device for Purifying Air Containing Dust, of which the following is a specification.

The present invention relates to an improved device for purifying air containing dust, particularly in connection with the various methods of cleaning carpets and the like by means of air sucked or pressed through the same. The air charged with dust is moistened or wetted on entering the device in order to deposit the dust, and an important object of the present invention is to automatically regulate the time and the amount of said moistening.

I attain the objects by the device illustrated in the accompanying drawing, in which said device is shown in vertical section.

The device consists of two reservoirs $a$ and $b$, separated from one another, of which the one, $a$, serves as dust-chamber and the other, $b$, as water-reservoir.

$c$ and $d$ are the admission and outgoing air-pipes.

A pipe $e$ having a right-angled socket $f$ forming the continuation of the air-admission pipe $c$ is in the chamber $a$, said pipe $e$ being enlarged at its lower end and closed by a valve $g'$ at the junction of the narrow and broad parts. A pipe $h$, extending through the water-reservoir $b$, is partly inside the pipe $e$ and connected by holes $i$ with the water in said reservoir and is closed at its lower end by a valve $g^2$. The valves $g'$ and $g^2$ are rigidly connected one with another. As illustrated, they consist of one piece with a common valve-rod $g$. A spring $k$ presses both valves on their seats.

When the (purified) air is sucked through the pipe $d$ from the chamber $a$, the reduced pressure thus arising opens the valve $g'$. Therefore air containing dust can come through the pipe $c$ and valve $g'$ into the lower end of the pipe $e$ and from there into the dust-chamber. As the valve $g'$ opens, valve $g^2$ opens also a corresponding distance, so that the air containing dust is moistened by the water flowing through the pipe $h$ and the dust is for the most part deposited. Between the pipes $e$ and $d$ more known devices for purifying the air can be arranged—which, for example, may be vertical or horizontal—but, however, do not form an essential part of this invention. An opening $l$ normally closed by a cover permits the water to be released and the dust-chamber to be cleaned.

What I claim as my invention, and desire to secure by Letters Patent, is—

1. A device for purifying air containing dust, comprising in combination an air-chamber, a water-reservoir above the same, means in said air-chamber adapted to admit air, means in said air-chamber adapted to admit water, said means being adapted to be actuated automatically and simultaneously, substantially as set forth for the purpose specified.

2. A device for purifying air containing dust, comprising in combination an air-chamber, a water-reservoir above the same, an air-admission pipe in said air-chamber, a valve in said air-pipe, means in said air-chamber adapted to admit water, said valve and said means being adapted to be actuated automatically and simultaneously, substantially as described.

3. A device for purifying air containing dust, comprising in combination an air-chamber, a water-reservoir above the same, an air-admission pipe in said air-chamber, a valve in said air-pipe, a water-admission pipe in said air-chamber, a valve in said water-pipe, said valves being adapted to be actuated automatically and simultaneously, substantially as described.

4. A device for purifying air containing dust, comprising in combination an air-chamber, a water-reservoir above the same, an air-admission pipe in said air-chamber, a valve in said air-pipe, a water-admission pipe extending into said reservoir, said water-pipe having a plurality of holes in said water-reservoir, and extending into said air-pipe, a valve in said water-pipe, said valves being adapted to be actuated automatically and simultaneously, substantially as described.

5. A device for purifying air containing dust, comprising in combination an air-chamber, a water-reservoir above the same, an air-admission pipe in said air-chamber, a water-admission pipe extending through said reservoir, and into said air-pipe, said water-pipe having a plurality of holes in said water-reservoir, a valve in said water-pipe, said valves being adapted to be actuated automatically and simultaneously, substantially as described.

6. A device for purifying air containing dust, comprising in combination an air-chamber, a water-reservoir above the same, an air-admission pipe in said air-chamber, a valve in said air-pipe, a water-admission pipe having a plurality of holes in said water-reservoir, said water-pipe extending into said air-pipe, a valve in said water-pipe, a rod rigidly connecting said valves, whereby said valves are adapted to be actuated automatically and simultaneously, substantially as described.

7. A device for purifying air containing dust, comprising in combination an air-chamber, a water-reservoir above the same, an air-admission pipe in said air-chamber, a valve in said air-pipe, a water-admission pipe having a plurality of holes in said water-reservoir, said water-pipe extending into said air-pipe, a rod rigidly connecting said valves, a spring engaging said water-pipe and said valve-rod, whereby said valves are adapted to be actuated automatically and simultaneously, substantially as described.

In testimony whereof I have signed my name to this specification in the presence of the two subscribing witnesses.

JOSEPH LÉON PALOUS.

Witnesses:
HENRY HASPER,
WOLDEMAR HAUPT.